United States Patent [19]

Nitschke

[11] 4,233,053
[45] Nov. 11, 1980

[54] SPEED ADAPTIVE CONVEYOR DRIVE FOR A GLASS MANUFACTURING SYSTEM

[76] Inventor: John S. Nitschke, 324 E. Second, Perrysburg, Ohio 43551

[21] Appl. No.: 21,136

[22] Filed: Mar. 16, 1979

[51] Int. Cl.³ .............................................. C03B 35/18
[52] U.S. Cl. ........................................ 65/163; 65/348; 198/790; 198/835; 271/198; 271/275
[58] Field of Search ................. 65/163, 348, 349, 350, 65/351; 271/198, 275; 198/832, 835, 789, 790

[56] References Cited
U.S. PATENT DOCUMENTS

| 4,032,003 | 6/1977 | Hull | 198/832 X |
|---|---|---|---|
| 4,133,667 | 1/1979 | Nitschke | 65/163 |

*Primary Examiner*—Arthur D. Kellogg
*Attorney, Agent, or Firm*—Reising, Ethington, Barnard, Perry & Brooks

[57] ABSTRACT

A conveyor drive for a glass manufacturing system transports a sheet of glass through a tempering station on a roller bed. The conveyor drive includes a pair of pulleys mounted at opposed ends of the tempering station. A continuous drive loop is trained over the pair of pulleys and engages the roller bed so that rotational motion of the pulleys is imparted to the roller bed. One pulley is driven by a motor to transport the glass through the station. The other pulley drives an electrical generator connected to a dissipative load. The generator and load provide an adaptive counter-torque to the other pulley in direct relation to its rotational speed. The counter-torque stabilizes the conveyor drive to prevent slip-stick friction from disrupting the transport of the glass sheet.

8 Claims, 2 Drawing Figures

SPEED ADAPTIVE CONVEYOR DRIVE FOR A GLASS MANUFACTURING SYSTEM

TECHNICAL FIELD

The present invention relates to glass manufacturing apparatus, and more particularly to a conveyor drive for use in such manufacturing apparatus.

BACKGROUND ART

The present invention is an improvement over the glass conveyor system disclosed in an earlier-filed application of the present inventor entitled Conveyor Drive Mechanism of a Glass Manufacturing System, U.S. Ser. No. 888,073, filed March 20, 1978 now U.S. Pat. No. 4,133,667.

In the system disclosed in the above-referenced application, a glass sheet was transported through a glass processing station on a roller bed formed of a plurality of elongated rollers. The rollers were supported on and in engagement with a continuous drive loop forming part of a conveyor drive. The continuous drive loop was trained over a pair of spaced pulleys, one pulley being disposed at each end of the glass processing station. By applying a driving torque to one of the pulleys of the conveyor drive, the continuous drive loop was caused to rotate and, in turn, impart rotational motion to the roller bed. The rotation of the roller bed caused the glass to be transported through the processing station.

The problem addressed by the invention disclosed in the earlier-filed application related to the phenomena of slip-stick friction and lost motion that were experienced when the conveyor drive was formed of a sprocket and chain arrangement. More specifically, the slip-stick friction phenomenon was caused by the chain experiencing a transition between the effects of high static friction and lower kinetic friction in a low speed range. In a transitional stage between these two types of friction, one portion of the chain can be experiencing high static friction while at the same time another portion is experiencing low kinetic friction. The chain between these two portions will stretch until the high static friction is suddenly overcome. The phenomenon manifests itself as an oscillation in the velocity of the moving chain and is disruptive to the transport of glass on the roller bed driven by the chain.

The lost motion phenomenon is particularly troublesome in an oscillating roller-hearth furnace that oscillates a glass sheet load within the furnace by alternatively driving the sprockets forward and backward. The lost motion is attributable to slack in the chain which must be taken out before rotation of the driving sprocket can be imparted to the roller bed.

The solution adapted by the earlier invention was to maintain a minimum predetermined amount of tension in the active portion of the continuous drive loop by the application of a counter-torque to the driven sprocket. One means of applying such a counter-torque was to use a pair of counter-poised motors with one motor connected in driving relation with each sprocket. Depending upon the amount of tension required in the continuous drive loop and the direction of travel of the glass, a control circuit selectively energized the pair of counter-poised motors in accordance with a predetermined control relation. Another means of applying the counter-torque to the driven sprocket in the case where the glass sheet travels continuously through this processing station was to connect the driven sprocket to a retarder. By either of these means, a minimum, predetermined tension was always present in the portion of the continuous drive loop in engagement with the roller bed.

DISCLOSURE OF THE INVENTION

The present invention is an improvement on the conveyor drive system disclosed in the earlier-referenced application in that it provides a counter-torque which is matched to the speed of the conveyor drive. More specifically, the present invention includes an adaptive control feature which causes the counter-torque to be a direct function of the conveyor drive speed.

This adaptive control feature is provided by using the rotational motion of the driven pulley of the conveyor drive to drive an electrical generator. The generator is loaded by a resistor or similar type dissipative load. The generator and resistor present an effective counter-torque to the driven pulley. The magnitude of the counter-torque at any given time is related directly to the rotational speed of the driven pulley. In this manner the counter-torque is at all times adapted to the speed of the conveyor drive.

The present invention has application in a continuous drive glass processing station where a glass sheet is transported continuously therethrough. In this application, the present system represents a major simplification over the counter-poised motor system disclosed in the earlier-referenced application. In particular, the system is inherently stable without need of a control circuit and speed sensor to be used to control the energization of the counter-poised motors. In the present system the chain tension increases with speed which overcomes the effect of high static friction and low running friction.

Other advantages of the present invention will be readily appreciated as the same becomes better understood by reference to the following detailed description when considered in connection with the accompanying drawings.

BEST MODE FOR CARRYING OUT THE INVENTION

Figure 1:
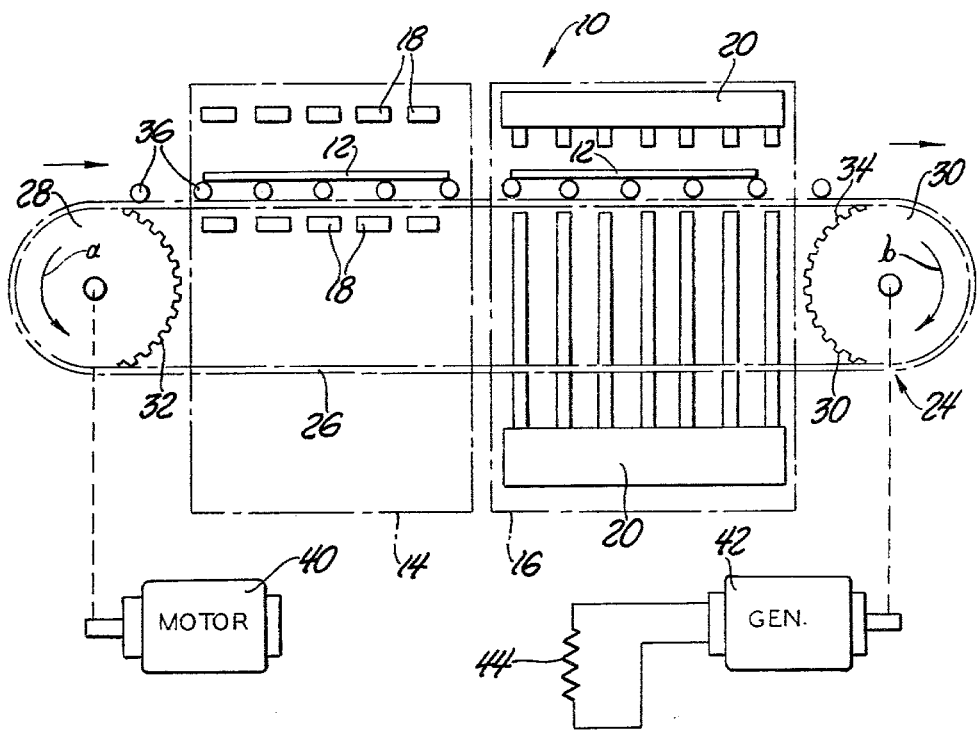
FIG. 1 is a schematic view of a two-stage glass tempering station in which sheets of glass are being transported therethrough by a conveyor drive system embodying the present invention.

FIG. 1 is a schematic illustration of a glass tempering station 10 in a glass manufacturing apparatus. The tempering station 10 is selected as representative of any of a number of different stations in glass manufacturing apparatus that employ a conveyor drive system for the transport of a glass sheet through the station. The tempering station 10 includes two distinct stages, a furnace stage 14 and a quench stage 16, each of which performs a cooperative function in the overall glass tempering process.

Broadly, the tempering step can be divided into two basic sub-steps. First, a glass sheet 12 which is to undergo tempering is subjected to heat from a plurality of heating elements 18 in the furnace stage 14 to raise the temperature of the glass sheet 12 to a relatively high level. In the second sub-step, the heated glass sheet 12 is subjected to a flow of cooling air on both of its sides from a plurality of air nozzles 20 in the quench stage 16. In general, the heating and rapid cooling of the glass plate 12 causes high compressive forces to exist at the outer surfaces of the sheet to minimize susceptibility to breakage and shattering. A more detailed understanding of the tempering process can be obtained from the disclosure of the patent to Harold A McMaster. U.S. Ser. No. 3,994,711, issued Nov. 30, 1976, whose disclosure is incorporated herein in its entirety.

The tempering station 10 includes a conveyor drive, generally illustrated at 24. The conveyor drive, typically cooperates with a second, like conveyor (not shown) disposed at the opposite lateral side of the station 10. The conveyor drive is a continuous drive loop 26 trained over first and second pulleys 28 and 30 which are spaced apart from one another along the direction of glass travel indicated by the arrows. In the preferred embodiment, the continuous drive loop 26 comprises an endless drive chain, and the first and second pulleys 28 and 30 have teeth 32 and 34 formed about their peripheries to define sprockets. The endless drive chain can, for example, be 3″ wide, ⅜ inch pitch steel timing chain which is commercially available from Morse Power Company.

A glass plate support bed is defined by a plurality of elongated, cylindrical rollers 36 of the type shown in the previously referenced U.S. Pat. No. 3,994,711. The rollers 36 are preferably formed of fused quartz and are spaced from one another along the direction of travel indicated by the arrows, and extend laterally with respect thereto. The opposed end portions of the rollers 36 are supported by and in frictional engagement with the active area of the continuous drive loop 26. It will be appreciated that rotational motion of the continuous drive loop 26 imparts motion to each of the elongated rollers 36 through the frictional engagement therebetween. The underside of the active area of the drive chain 26 may ride over a wear plate, which is not shown in the drawing figure for simplicity of illustration.

A first torque source in the form of a motor 40 is connected to the first pulley 28 to provide driving torque to the conveyor drive 24. The direction of the torque applied by motor 40 is indicated by the arrow a on the pulley 28.

A generator 42 is connected to the shaft of the second or driven pulley 30 so as to be driven thereby. A dissipative load, such as a resistor 44, is connected across the output terminals of the generator 42 to dissipate the electrical energy generated by the driving of the generator 42 by the pulley 30.

The generator 42 and resistor 44 represent an effective counter-torque applied to the pulley 30 in the direction of the arrow b. The magnitude of the counter torque is related directly to the rotational speed of the driven pulley 30. As speed increases so does drag. This imparts the stabilizing action by offsetting the negative change in other friction forces as speed increases.

Figure 2:
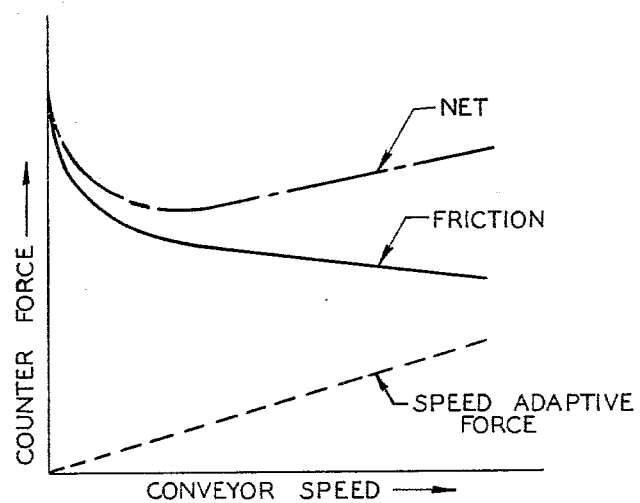
FIG. 2 is a graph showing contributory and net counter-forces on a conveyor drive embodying the present invention.

More specifically, the generator 42 and load 44 impart a stabilizing action by offsetting the slightly decreasing friction-speed characteristic of the chain 26. With reference to FIG. 2, the frictional characteristic in the speed range of interest is shown by the curve labeled "FRICTION." This curve has a negative slope in the transition from static to kinetic friction. In the transitional range the chain will be unstable, i.e., the faster it moves the less the friction, and oscillations will occur.

See, for example, *Machinery Handbook*, 18th Edition, 1968, p. 521, "Laws of Friction," Sec. 2, Industrial Press, New York, N.Y. 10016.

The generator 42 and load 44 provide a speed adaptive counter force indicated by the curve labeled "SPEED ADAPTIVE FORCE." This curve is monotonically increasing in linear relation to speed.

The net counter-force on the chain is shown in the curve labeled "NET". This curve has a positive slope (except for very low speeds) and imparts stability to the chain.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A conveyor drive system for transporting a glass sheet through a glass processing station along a direction of travel comprising:
    a conveyor drive defined by at least one continuous drive loop trained over first and second pulleys mounted at opposed ends of a lateral side of the processing station;
    a plurality of elongated rollers spaced apart from one another along the direction of travel and extending transversely with respect thereto, the plurality of rollers being in driving engagement with the conveyor drive for rotational motion upon motion of the continuous drive loop;
    drive torque means, coupled to the first pulley of the conveyor drive, for providing driving torque to the conveyor drive to move the glass sheet along the direction of travel; and
    means, driven by the second pulley of the conveyor drive, for providing a counter-torque which increases with the speed of the second pulley for the purpose of stabilizing the motion of the conveyor drive.

2. The conveyor drive system as defined in claim 1, wherein the means driven by the second pulley comprises,
    generator means, coupled to the second pulley in driven relation therewith, for generating electrical energy in response to rotation of the second pulley; and
    load means, connected to the generator means, for electrically loading the generator means to provide a resultant counter-torque adapted to the speed of the conveyor drive.

3. The conveyor drive system as defined in claim 2 wherein the load means is dissipative.

4. The conveyor drive system as defined in claim 3 wherein the load means is a resistor.

5. The conveyor drive system as defined in claim 1 wherein the continuous drive loop comprises an endless drive chain, and the pulleys are toothed at their peripheries to engage the drive chain.

6. The conveyor drive system as defined in claim 1 wherein each of the rollers has an elongated cylindrical form and is formed of fused quartz.

7. The conveyor drive system as defined in claim 1 wherein the engagement of the rollers with the conveyor drive is frictional.

8. In a glass sheet conveyor system for a glass processing station of the type having a conveyor drive defined by at least one continuous drive loop trained over first and second spaced pulleys mounted at opposed ends of a lateral side of the processing station; a glass sheet transport bed defined by a plurality of elongated rollers, the plurality of rollers being in driving engagement with the continuous drive loop; and torque means for applying torque to the first pulley of the conveyor drive; the improvement comprising:

means driven by the second pulley for applying an adaptive counter-torque to the second pulley of the conveyor drive in response to the speed of the second pulley, which, in cooperation with the torque means stabilizes the motion of the conveyor drive against slip-stick frictional phenomenon.

* * * * *